(No Model.)
H. W. FISHEL.
BOUTONNIÈRE.
No. 502,852. Patented Aug. 8, 1893.
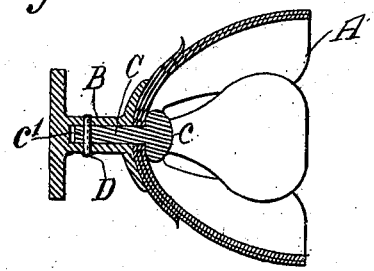
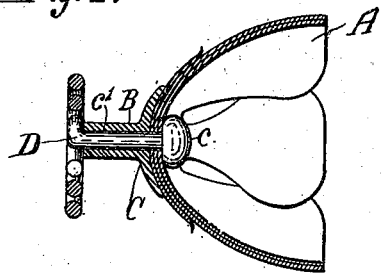
WITNESSES:
William M. Iliff
David A. Smith
INVENTOR
Henry W. Fishel
BY
Edwin H. Brown
his ATTORNEY

UNITED STATES PATENT OFFICE.

HENRY W. FISHEL, OF NEW YORK, N. Y.

BOUTONNIÈRE.

SPECIFICATION forming part of Letters Patent No. 502,852, dated August 8, 1893.

Application filed May 10, 1893. Serial No. 473,669. (No specimens.)

*To all whom it may concern:*

Be it known that I, HENRY W. FISHEL, of the city, county, and State of New York, have invented a certain new and useful Improvement in Boutonnières, of which the following is a specification.

I will describe a boutonnière, embodying my improvement and then point out the novel features in a claim.

In the accompanying drawings, Figure 1 is a central longitudinal section of a boutonnière, embodying my improvement. Fig. 2 is a central longitudinal section of a boutonnière of modified form, embodying my improvement.

Similar letters of reference designates corresponding parts in both figures.

A designates an artificial flower of any desired kind.

B designates a stem or post, which may be made of any suitable material. At one end it is hollow, and at the other end, it is provided with a back-plate or shoe, which may be made in the form of a laterally extending flange.

C designates a pin, which has a head c, and a body c'. The body is passed through the flower and into the hollow of the stem or post. The head rests inside the flower.

D designates a cross-pin, which is driven through a hole in the stem or post into the hollow of the body of the pin. At its ends this cross pin may be riveted, or may otherwise be secured in place. In Fig. 2 I have shown a similar construction except that the stem or post has no backplate or shoe, and instead of a separate cross-pin, passing through the stem or post and the pin C, I have made the pin extend transversely across the wall of the post, so as to form a cross-pin or piece D, and beyond this portion, I have expanded it in the form of a helix or spiral to constitute a back-plate or shoe.

In each form of my invention, there is a stem or post, a pin for fastening the flower through it and a cross-pin or piece for engaging the first mentioned pin with the stem or post.

What I claim as my invention, and desire to secure by Letters Patent, is—

In a boutonnière the combination of a stem or post, an artificial flower or like device, a pin passing through the latter and a cross-pin or piece engaging the stem or post and the first mentioned pin together, substantially as specified.

In testimony whereof I have signed my name to this specification in the presence of two subscribing witnesses.

HENRY W. FISHEL.

Witnesses:
 ANTHONY GREF,
 WILLIAM M. ILIFF.